United States Patent [19]
Holehan

[11] Patent Number: 5,887,995
[45] Date of Patent: Mar. 30, 1999

[54] TOUCHPAD OVERLAY WITH TACTILE RESPONSE

[75] Inventor: Steven D. Holehan, Magnolia, Tex.

[73] Assignee: Compaq Computer Corporation, Houston, Tex.

[21] Appl. No.: 935,789

[22] Filed: Sep. 23, 1997

[51] Int. Cl.[6] ................................................. B41J 5/08
[52] U.S. Cl. ................................. 400/479.1; 400/491.3; 341/22; 341/33; 345/168
[58] Field of Search ................................ 400/489, 491, 400/479.1, 479.3; 345/168; 341/22, 33; 361/680

[56] References Cited

U.S. PATENT DOCUMENTS

| | | | |
|---|---|---|---|
| 4,550,221 | 10/1985 | Mabusth | 178/18 |
| 4,684,767 | 8/1987 | Phalen | 200/5 |
| 4,733,222 | 3/1988 | Evans | 340/365 |
| 5,149,923 | 9/1992 | Demeo | 200/5 |
| 5,250,929 | 10/1993 | Hoffman et al. | 345/146 |
| 5,463,388 | 10/1995 | Boie et al. | 341/33 |
| 5,613,137 | 3/1997 | Bertram et al. | 395/800 |
| 5,674,018 | 10/1997 | Kaufman | 400/473 |

Primary Examiner—Edgar Burr
Assistant Examiner—Dave A. Ghatt
Attorney, Agent, or Firm—Michael F. Heim; Conley, Rose & Tayon

[57] ABSTRACT

A computer system includes a touchpad with one or more overlays providing the computer system with various input control functions. The overlay preferably includes tactile response elements to provide tactile feedback to the operator as an indication that a portion of the overlay has been pressed. The touchpad includes a capacitive sensor. Electronics coupled to the touchpad determine which portion of the touchpad sensor surface area has been touched or pressed. The amount of tactile feedback to the computer operator can be varied through the design and construction of the overlay and the overlay may be provided with no tactile feedback, if desired. As such, numerous overlays can be placed on the touchpad of the computer system, thereby providing the computer system with multiple different input control functions. The computer operator may manually input the type of overlay being used into the computer. Alternatively, a portion of the touchpad surface area maybe dedicated to encoding overlay identification information using any one of a variety of techniques. Thus, the computer system may automatically detect the type of overlay used.

15 Claims, 5 Drawing Sheets

TOUCHPAD OVERLAY WITH TACTILE RESPONSE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to an input control device for a personal computer. Still more particularly, the present invention relates to an overlay device with tactile feedback for a touchpad.

2. Background of the Invention

The complexity of functions preformed by personal computers has created a need for more sophisticated input and output devices for controlling the operation of the computer. For example, the mouse was developed to facilitate control of the movement of a cursor on the computer screen. Other input devices for controlling the computer such as a track ball and joystick are widely available.

Keyboards used with desktop computers typically have 100 or more keys. Many of such keyboards include a 10 digit keypad to enable an operator to quickly and efficiently input numbers into a database, for example. Arrow keys, and other special purpose keys, are also included on such keyboards The keyboards provided in laptop or portable computers, however, necessarily must be smaller than keyboards provided in desktop computers. Accordingly, keyboards used with laptop computers include fewer keys than keyboards in desktop computers. A laptop keyboard typically includes only 85 keys. Most laptop computer keyboards do not include a separate 10-digit keypad as do keyboards in desktop computers. Instead, the functions performed by the 10-digit keypads of desktop computers are added to existing keys on a laptop computer's keyboard. Thus, many keys on a laptop computers keyboard perform two or more functions, each function individually selected by pressing that key in combination with another key.

In a standard 10-digit keypad the keys are aligned vertically and horizontally allowing an operator to quickly press the keys without having to look down. Because the keys on which the numeric function keys are added in the laptop computer are staggered as shown in FIG. 1, the configuration of the numeric keys in a laptop computer's keyboard is different than the configuration in a standard desktop keyboard. This configuration difference is not desirable for operators that must quickly and repeatedly enter numbers into a database. All else being equal, laptop computer operators would prefer to have a full size keyboard, such as the keyboards used in desktop computers.

The sophistication of software, and particularly computer games, has fueled a need for more sophisticated input control devices. Joysticks, game controllers, and other control devices have been developed and are available to satisfy many different software needs. These devices typically plug into a connector on the rear portion of computer chassis. As the computer operator switches between software programs, the operator may have to switch input control devices disconnecting one control device and plugging in another. Often, the computer must be reset ("rebooted") to communicate properly with a newly connected control device.

The lack of room in a typical laptop computer's carrying case and the weight of multiple input control devices makes using multiple input control devices with a laptop computer system less than desirable. Even with a desktop computer system, having multiple input control devices can be cumbersome, as well as substantially increasing the cost of the system. Further, software developers usually are limited to the control devices currently available for computers. Although currently available control devices may not provide the most optimal control scheme for a particular program, computer programs, nevertheless, usually are designed to be operated with one of the available control devices to avoid requiring the operator to incur the substantial expense in buying a new control device that may be useless for other programs.

In sum, there is a substantial need to provide a greater number of input control devices to a personal computer system, particularly to a laptop computer. It would be especially advantageous to have a computer system with increased input control capability without increasing the size, weight, and number of peripheral computer control devices.

SUMMARY OF THE INVENTION

The deficiencies of the prior art described above are solved in large parts by a computer system including a processor, a display device, a keyboard, an input control device, and an overlay placed near or on top of the input control device. The input control device preferably includes a capacitive touchpad that is divided into a plurality of touchpad regions. The overlay includes a flexible plate or membrane that similarly is divided into a plurality of overlay regions. In accordance with a preferred embodiment of the invention, each overlay region substantially covers a single touchpad region. Thus, each overlay region is associated with a touchpad region. Touching or pressing an overlay region changes the capacitance of the associated touchpad region. The computer system detects the capacitance change of the touchpad regions, thereby determining which overlay region was touched or pressed. Accordingly, the computer system selectively responds to an operator touching or pressing one of the overlay regions.

In accordance with another embodiment of the invention, the overlay also includes a tactile response element corresponding to each overlay region. The tactile response elements change shape only when a minimum level of force is applied to the corresponding overlay region. An operator pressing an overlay region with at least the minimum required force will feel the change in shape of the tactile response element, and thus know that the overlay region has been pressed. Such tactile response is desirable in many situations. For example, the overlay may comprise a ten-digit keypad and the tactile response feature of the overlay helps the operator know that he or she has pressed a numeric key.

In accordance with another embodiment of the invention, one of the touchpad regions comprises an identification region to allow the computer system to determine which overlay the operator is using and respond accordingly. Each overlay includes an identification code that is encoded in the region of the overlay associated with identification region of the touchpad. Each overlay identification code changes the capacitance of the identification region of the touchpad in a unique way. The computer system determines the identification code by determining the capacitance changes of the identification region of the touchpad. Alternately, the operator can manually input into the computer system which overlay is being used.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of a preferred embodiment of the present invention, reference will now be made the accompanying drawings, wherein:

FIG. 4b illustrates a touchpad with an alternative overlay identification scheme to that of FIG. 5a;

DETAILED DESCRIPTION OF A PREFERRED EMBODIMENT

Figure 1:
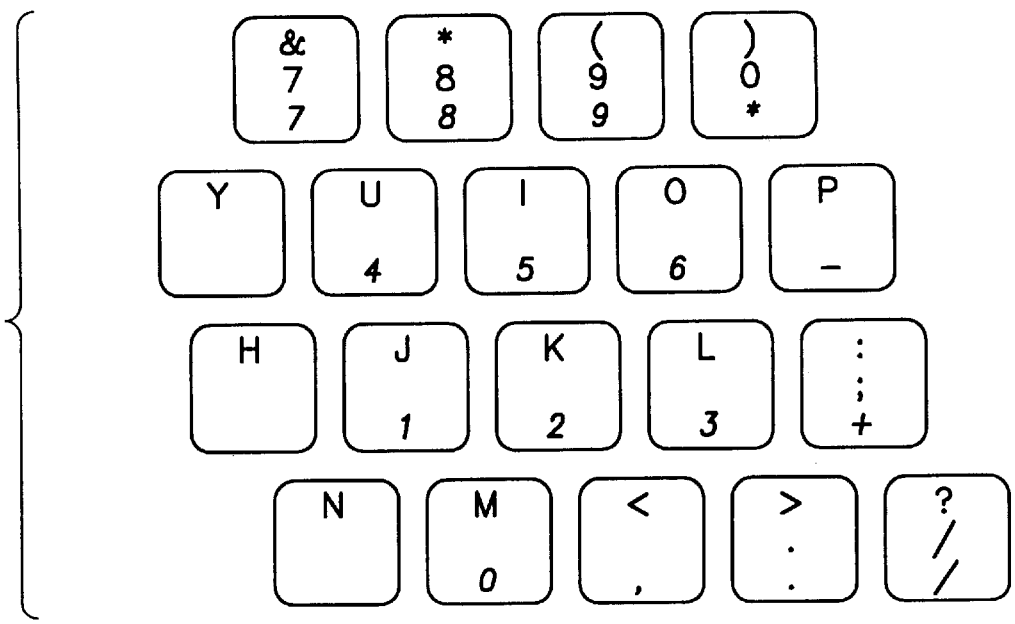
FIG. 1 is a top view of a portion of a standard laptop computer keyboard.
Figure 2:
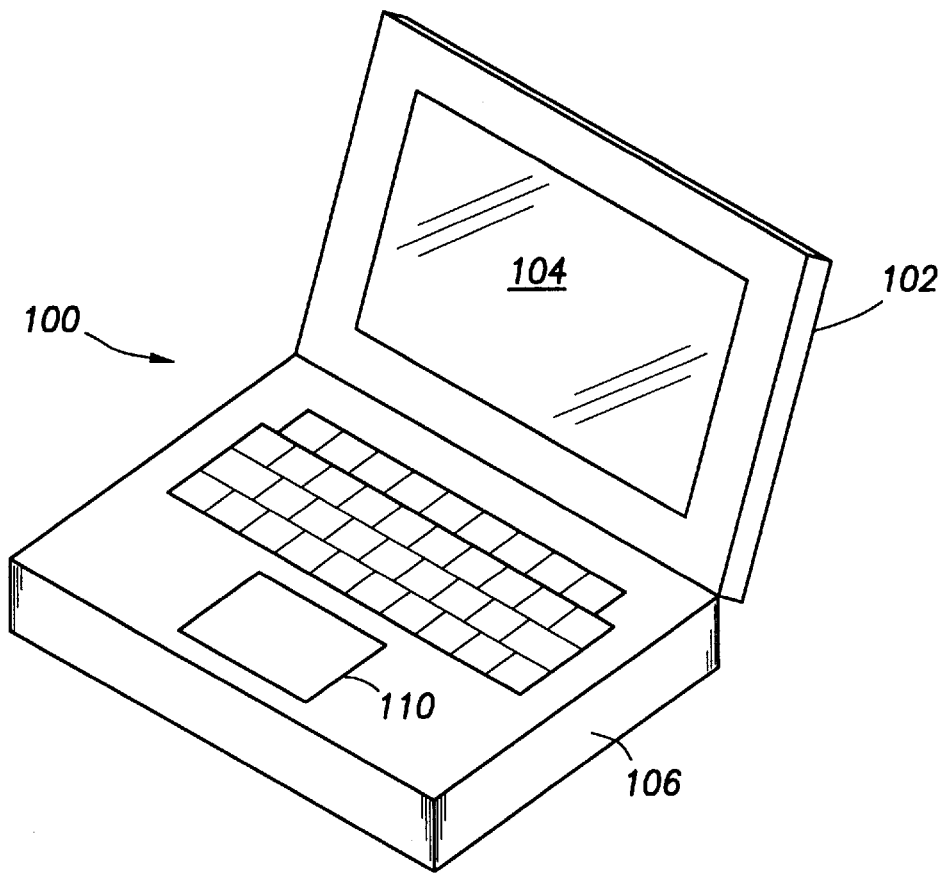
FIG. 2 is a perspective view of a laptop computer including a touchpad.

Referring now to FIG. 2, a computer system 100, constructed in accordance with a preferred embodiment of the invention, includes a display device 102 and a keyboard unit 106. Display unit 102 includes a viewable screen area 104. Keyboard unit 106 includes a touchpad sensor 110. Although the computer system 100 shown in FIG. 1 represents a laptop computer, the preferred embodiments of the invention are not limited to laptop computers and also include desktop and other types of computer systems.

As will be described in greater detail with respect to FIGS. 6 and 7, touchpad sensor 110 preferably comprise a capacitive sensor device available on many laptop computers. U.S. Pat. No. 5,374,787, included herein by reference, discloses one type of capacitive touch pad and further describes associated circuitry necessary to operate the touch pad. In accordance with known techniques, such as those illustrated in U.S. Pat. No. 5,374,787, computer system 100 can determine the location of the operator's finger placed on or near the touchpad 110 by detecting localized changes in capacitance cause by the operator's finger.

Figure 3:
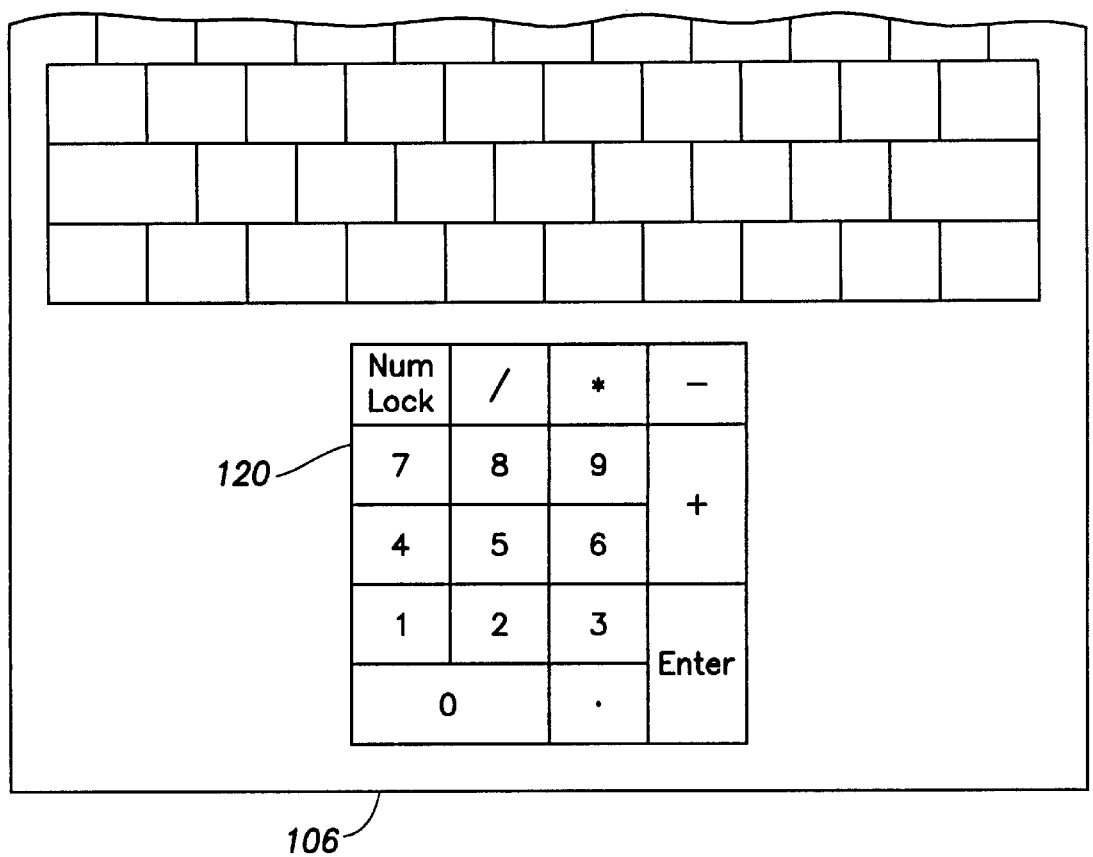
FIG. 3 illustrates a portion of a computer keyboard with an exemplary overlay on top of a touchpad, in accordance with the preferred embodiment of the invention.

A preferred embodiment of the invention includes the touchpad 110 in conjunction with an overlay as illustrated in FIG. 3. Referring now to FIG. 3, the touchpad 110 of FIG. 2 is covered by an overlay 120. The exemplary overlay 120 of FIG. 3 is shown as a 10-digit keypad. Accordingly, the exemplary overlay 120 in conjunction with touchpad 110 provides a standard 10-digit keypad configuration for the laptop computer 106.

Multiple overlays may be used in conjunction with touchpad 110 shown in FIG. 2. Accordingly, a user may desire to use a 10-digit keypad overlay such as that shown in FIG. 3, or alternatively, to use different overlays for operating different computer programs and games. Regardless of the particular overlay used, using techniques such as that described in U.S. Pat. No. 5,374,787, the computer system 100 can determine which portion or portions of an overlay are touched or pressed by the operator thereby determining the location of the operator's finger on or near the touchpad 110.

In accordance with a preferred embodiment of the invention, an overlay is divided into one or more overlay regions, each region generally corresponding to a different function. In FIG. 3, the overlay 120 includes regions corresponding to the ten numeric digits, the NUM LOCK key, the divide, multiply, subtraction, and addition operations, the decimal point, and the ENTER key. The touchpad 110 includes regions on the surface of the touchpad corresponding to the overlay regions. Preferably, each overlay region substantially covers each touchpad region when the overlay is laid on top of the touchpad. In accordance with known techniques, and described in detail below, the computer system 100 determines which overlay region an operator touches or presses by detecting the localized capacitance changes that result from a finger placed on or near the touchpad.

Once the computer system 100 determines which region of an overlay an operator has touched or pressed, the computer system responds in an appropriate manner. For example, if the "+" region of overlay 120 is touched, the computer performs the addition operation. Moreover, different overlays from that shown in FIG. 3 can be provided to provide different input control functions for the computer system. Each overlay may include a different number and configuration of regions from that illustrated by overlay 120 in FIG. 3. Accordingly, the computer system must be programmed to map the surface of the touchpad 110 in accordance with the overlay being used. The preferred embodiment of the invention effectively provides a computer system with new input control capability using the computer's existing touchpad device. The following discussion describes how the computer system 100 can be made aware of which overlay is being used.

In accordance with one embodiment of the invention, the operator may manually indicate to the computer system 100 the particular overlay being used by typing a command or selecting an overlay from a list of overlays. In response to that selection, the computer system 100 preferably loads the software associated with the overlay chosen by the operator. For example, if the operator places the 10-digit keypad overlay 120 on touchpad 110, the computer system 100 loads its calculator program.

Alternatively, some overlays will be usable in conjunction with multiple computer programs. Ten-digit keypad overlay 120, for example, may be used for inputting numeric data into a database, as well as being used in conjunction with a calculator program. Accordingly, the operator may load the desired computer program and place an overlay on the touchpad 110 to be used in conjunction with that program.

Figure 4A:
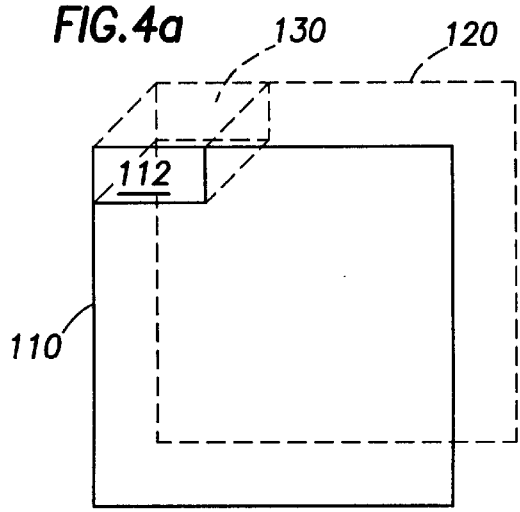
FIG. 4a illustrates one embodiment of a touchpad including an overlay identification region.
Figure 4B:
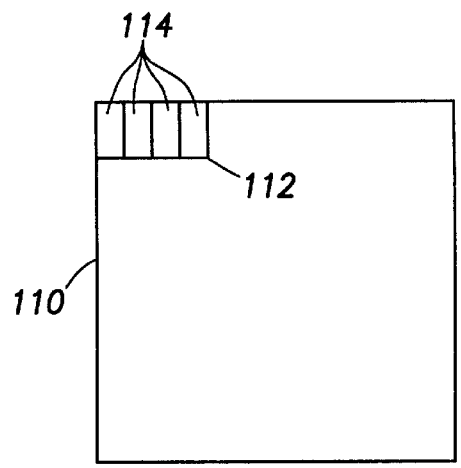

Another embodiment of the invention includes the computer system 100 automatically detecting the presence of and determining the type of overlay in place on touch pad 110. Although numerous techniques for automatic detection and determination of an overlay type are possible, FIGS. 4a and 4b illustrate two possible techniques. Referring first to FIG. 4a, a portion 112 of touchpad 110 may be designated through which overlay identification information is encoded. As such, computer system 100 determines when an overlay is placed on touchpad 110 and, if so, determines the type of overlay by decoding identification information through identification region 112. In the embodiment of FIG. 5a, the capacitive field associated with identification region 112 of touchpad 110 has a nominal capacitance value. The region of an overlay that rests on top of identification section 112 of touchpad 110 (overlay region 113) preferably varies the magnitude of the capacitive field in the touchpad identification region 112. Accordingly, identification information can be encoded by varying the capacitive field in identification region 112. The region 113 of the overlay corresponding to the identification region 112 thus alters the capacitive field of region 112 thereby indicating to the computer system the type of overlay in place. Using standard principals and techniques, each individual overlay type varies the magnitude of the capacitive field in identification region 112. For example, the type and amount of material comprising the region of the overlay that rests on top of the touchpad identification region 112 will have an effect on the capacitive field of the identification portion. Accordingly, an identification code can be encoded into each overlay during construction of the overlay region 113.

Referring now to FIG. 4b, an alternative overlay identification technique divides the identification portion 112 into two or more regions 114. Each region 114 is associated with a single bit in a digital identification value. The portion of the overlay corresponding to identification region 112 forces the magnitude of the capacitive field in each region 114 to one of two values (i.e., bits). With four identification code bits, $2^4$ or 16 different overlay identification codes are possible. Although four identification bits are illustrated in FIG. 4b, fewer than four or more than four are possible depending on the number of different overlays desired.

Figure 5:
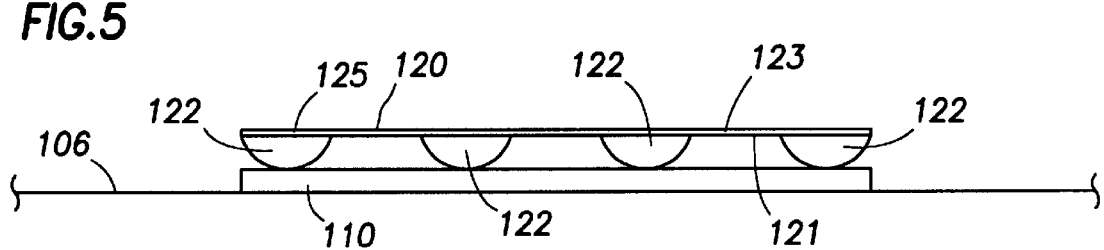
FIG. 5 shows a cross sectional view of the overlay including tactile response elements and the touchpad of FIG. 3.

Many computer operators desire some form of tactile response or feedback when pressing a key or button as an indication that the key or button has been pressed. Accordingly, FIG. 5 illustrates one technique for providing tactile feedback to overlay 120. As shown overlay 120 preferably includes a flexible membrane or plate 125 and one or more tactile response elements 122. Flexible plate 125 includes an upper surface 123 and a bottom surface 121. Flexible plate 125 and tactile response elements 122 are formed of silicone rubber, EPDM rubber, or other suitable material.

Tactile response elements 122 preferably are formed on the bottom surface 121 of overlay 120. When overlay 120 is in place on touchpad 10, tactile response elements 122 rest on top of touchpad 110. When sufficient force is applied to the top surface 123 of overlay 120, a tactile response element 122 below the point where the force is applied alters its shape or deforms. The operator senses the change in shape of the tactile response element 122, thereby knowing that the region of the overlay corresponding to that tactile response element has been pressed. In accordance with known principles, the amount of force required to deform each tactile response element 122 is determined by the type of material and shape of the response element. Thus, various amounts of tactile feedback can be incorporated into overlay 120 using standard manufacturing and design techniques for the tactile response elements 122.

Figure 6:
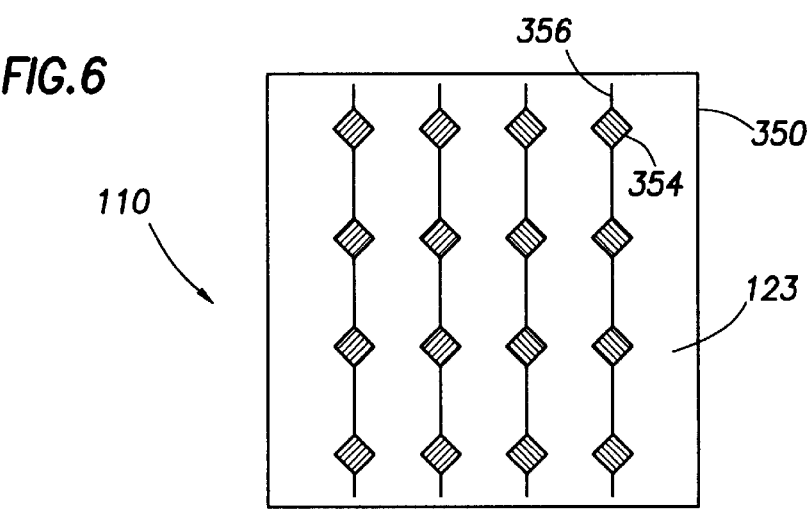
FIG. 6 is a top view of the touchpad of FIG. 2 and includes a plurality of capacitive elements connected by columns of conductive traces.
Figure 7:
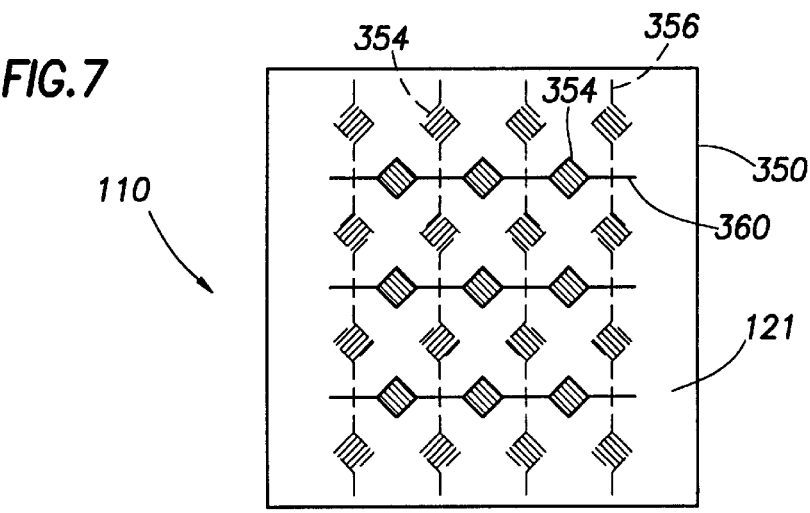
FIG. 7 is a bottom view of the touchpad of FIG. 6 and also includes a plurality of capacitive elements connected by rows of conductive traces.

Referring now to FIG. 6 and 7, the construction of the touchpad 110 is illustrated. In accordance with the embodiment of FIGS. 6 and 7, touchpad 110 includes a substrate 350 with a top surface 123 (FIG. 6) and a bottom surface 121 (FIG. 7). Top and bottom surfaces 123, 121 include a plurality of capacitive elements 354 formed in a diamond shape as shown, or other suitable shapes. The capacitive elements 354 on the top surface 123 of substrate 350 connect via conductive traces 356 preferably in the vertical shown in FIG. 6. The capacitive elements 354 on the bottom surface 121 of the substrate 350 connect via conductive traces 360. Conductive traces 360 preferably run in an orthogonal direction to the direction of conductive traces 356 although other orientations also are possible. In FIG. 7, the capacitive elements 354 and conductive traces 356 from the top surface 123 of the substrate 350 are indicated in dotted lines on the bottom surface 358 illustrating the relative location of the conductive traces and capacitive elements from the top and bottom surfaces 123 and 121.

Figure 8:
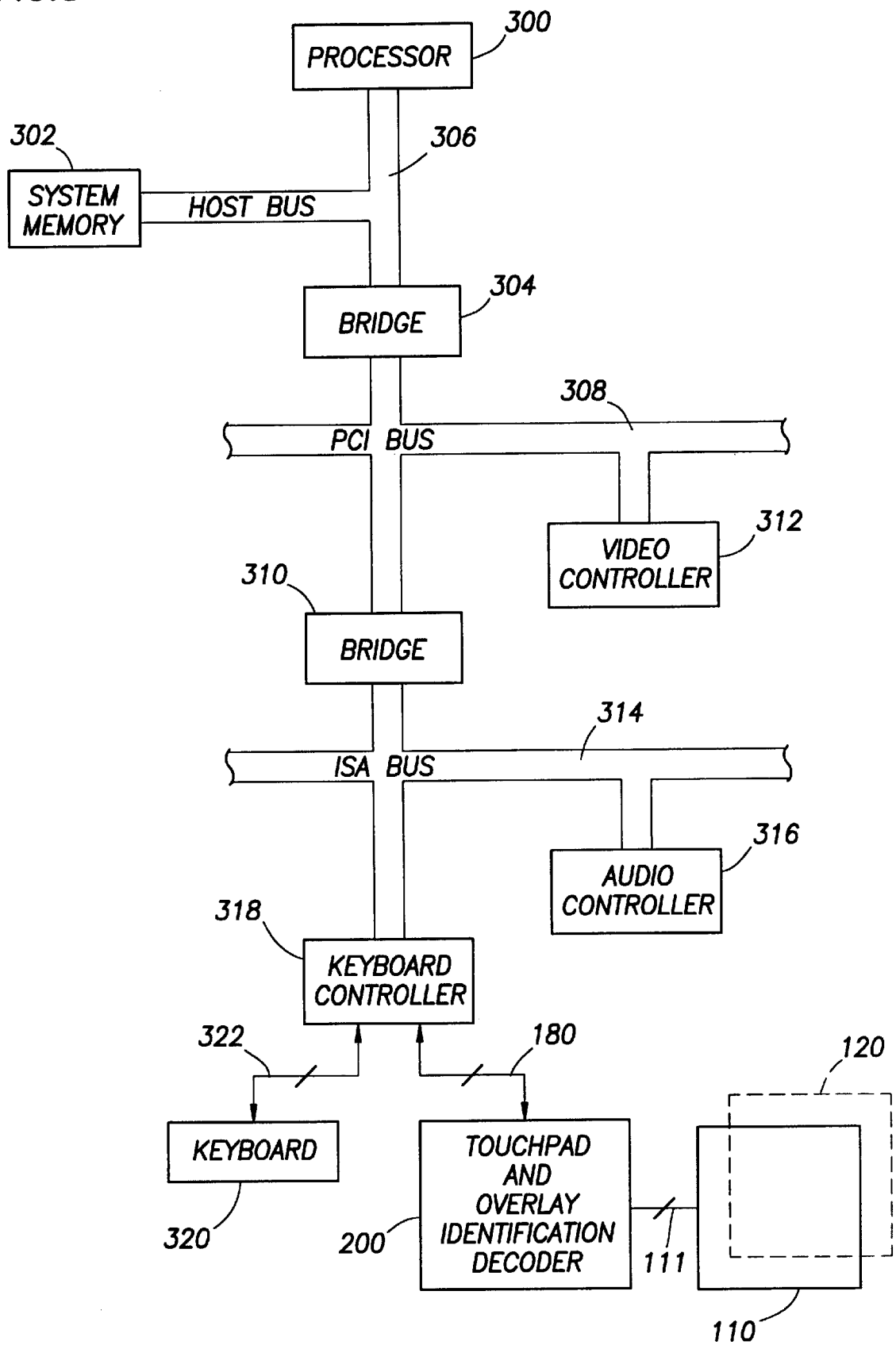
FIG. 8 illustrates a block diagram of a computer system in accordance with a preferred embodiment and including a touchpad and overlay identification decoder.

Referring now to FIG. 8, an exemplary computer system implementing the touchpad 110 and overlay 120 of FIG. 2 preferably includes a processor 300, system memory 302, bridges 304, 310, a video controller 213, a keyboard controller 318, keyboard 320, and touchpad and overlay identification decoder 200. A host bus 306 couples the processor 300 to system memory 302 and the bridge 304. The bridge 304 provides an interface between the host bus 306 and a peripheral component interconnect ("PCI") bus 308. Numerous PCI devices, such as video controller 312, may couple the PCI bus 308 in addition to bridge 310 which provides an interface between the PCI bus 308 and another bus, such as ISA bus 314. Various devices such as an audio controller 316 and a keyboard controller 318 couple to the ISA bus 314.

A keyboard 320 couples via lines 322 to the keyboard controller 318. Further, touchpad and overlay identification decoder 200 couples to touchpad 110 via lines 111. As such, the touchpad 110 couples to the processor 300 via touchpad and overlay identification decoder 200, keyboard controller 318, and bridges 304, 310. Keyboard controller 318 may include available keyboard controllers such as the 8051 microcontroller family manufactured by Philips or may include a custom design.

Figure 9:
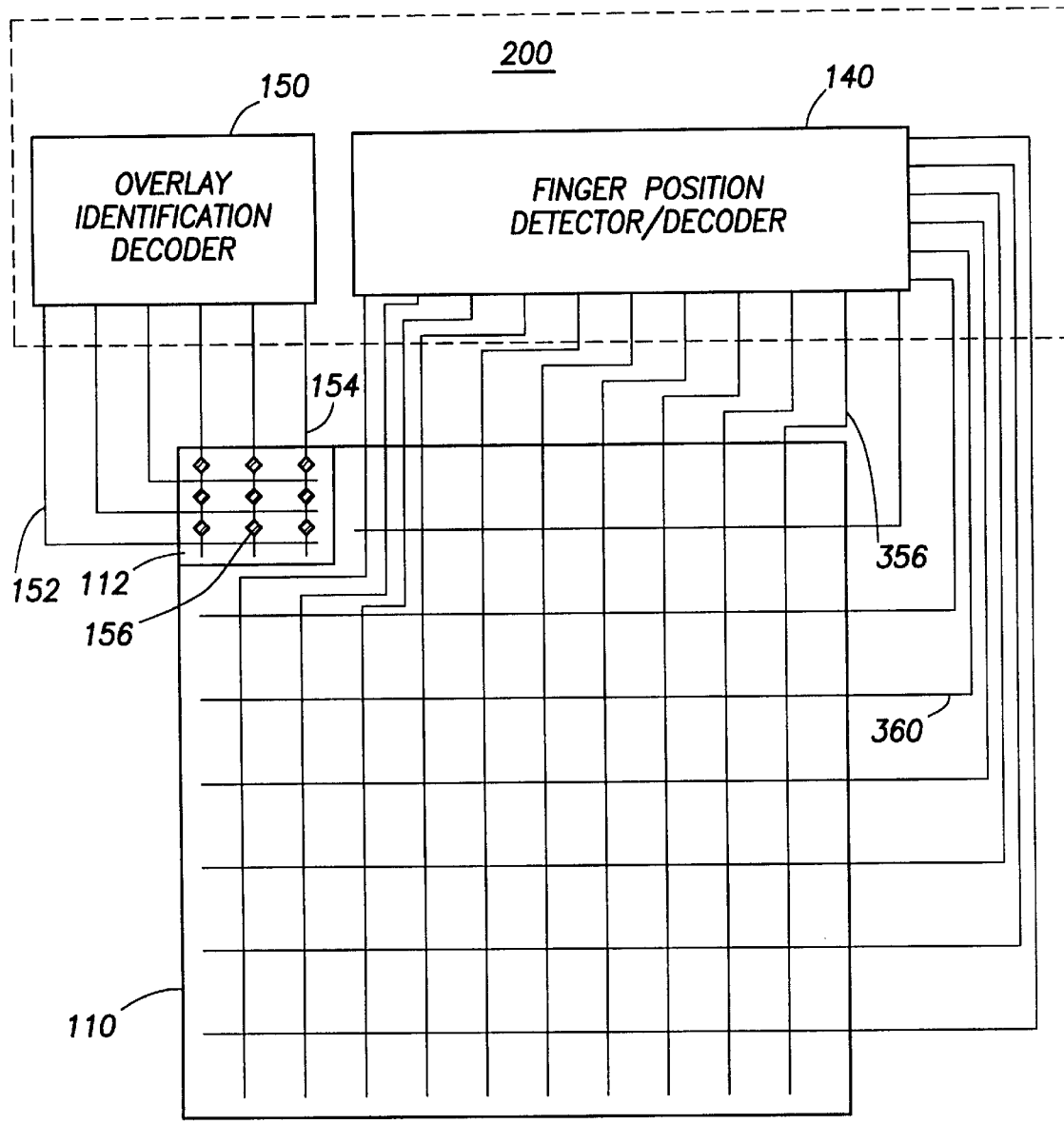
FIG. 9 illustrates a block diagram of the touchpad overlay and identification decoder of FIG. 8.

Referring now to FIG. 9, touchpad and overlay identification decoder 200 includes a finger position detector/decoder circuit 140 and an overlay identification decoder circuit 150. Touchpad 110 preferably couples via x and y conductive lines 360 and 356, respectively, to the finger position detector/decoder circuit 140. Finger position detector/decoder 140 includes known circuitry such as that disclosed in U.S. Pat. No. 5,374,787, for determining the location of the operator's finger on or near the touchpad 110.

Additionally, the identification region 112 of touchpad 110 includes capacitive elements 156 on either side of the substrate connected by conductive traces 152 in the x direction on one side of the substrate and conductive traces 154 in the y direction on the opposite side of the substrate, in a similar fashion to that illustrated in FIGS. 6 and 7. The conductive traces 152, 154 preferably couple to the overlay identification decoder 150 which determines the identification code for the overlay in accordance with the techniques described above with respect to FIGS. 4a and 4b, or other suitable techniques. Overlay identification decoder 150 includes known circuit components, such as charge integrators and comparators, detects the presence of an overlay, and determines the capacitance distribution profile of identification region 112. The capacitance distribution profile of region 112 encodes the overlay identification information.

In summary, the preferred embodiments of the invention described above advantageously provide a computer system, such as a laptop computer, with a variety of input control functions without additional peripheral input control devices. The overlay of the preferred embodiments may also include tactile response elements to give the operator a tactile response or feedback that he or she has in fact pressed a desired region of the overlay. Techniques for automatically determining the type of overlay used by an operator are also provided allowing for a more user-friendly computer system. The preferred embodiments described above also provide the computer system with increased input control capability at a much lower cost than would otherwise be required if additional hardware input control devices were developed.

Numerous variations and modifications will become apparent to those skilled in the art once the above disclosure is fully appreciated. It is intended that the following claims be interpreted to embrace all such variations and modifications.

What is claimed is:

1. A computer system, comprising:

a processor;

a display device coupled to said processor;

a keyboard coupled to said processor;

a touchpad coupled to said processor; and an overlay used in conjunction with said touchpad, said overlay including a plurality of tactile response elements, each tactile response element having a deformable curved surface that deforms in response to a sufficient amount of force applied to said response element by a computer operator to provide positive tactile feedback to indicate when said overlay has been pressed.

2. A computer system as in claim 1 wherein said overlay is located on top of said touchpad.

3. A computer system as in claim 2 wherein said touchpad comprises a capacitive touchpad.

4. A computer system as in claim 3 wherein said overlay includes a flexible plate having the tactile response elements.

5. A computer system of claim 4 wherein the tactile response elements can be individually touched by an operator and said capacitive touchpad includes a plurality of touchpad regions, each touchpad region associated with a tactile response element.

6. A computer system has in claim 5 wherein each of said tactile response elements contacts one of said touchpad regions.

7. A computer system as in claim 6 wherein said computer system selectively responds to each tactile response element when each tactile response element is touched.

8. A computer system as in claim 7 wherein said computer system responds differently to each tactile response element when each tactile response element is touched.

9. A computer system as in claim 8 wherein capacitive touchpad is coupled to said keyboard.

10. A computer system, comprising:

a processor;

a display device coupled to said processor;

a keyboard coupled to said processor;

a capacitive touchpad coupled to said processor, said capacitive touchpad including a plurality of touchpad regions; and an overlay comprising a plurality of tactile response elements, each tactile response element associated with a corresponding touchpad region and each of said tactile response elements is positioned substantially over said corresponding touchpad regions;

wherein said computer selectively responds to the touching of each tactile response element;

wherein one of said touchpad regions comprises an overlay identification region and said overlay includes an identification code;

an overlay identification decoder logic to determine the identification code of said overlay by monitoring the change in capacitance of said identification region caused by said overlay.

11. A computer system as in claim 10 wherein said identification code includes a digital value.

12. A computer system, comprising:

a processor;

a display device coupled to said processor;

a keyboard controller coupled to said processor;

a keyboard coupled to said keyboard controller; and a capacitive touchpad and overlay identification unit coupled to said keyboard controller for receiving an overlay, said overlay identification unit including a means responsive to changes in the capacitance of said capacitive touchpad caused by said overlay to indicate the type of overlay.

13. A computer system as in claim 12 wherein said touchpad and overlay identification unit includes a finger position detector/decoder.

14. A computer system as in claim 13 wherein said touchpad and overlay identification unit further includes an overlay identification decoder.

15. A computer system as in claim 14 wherein said capacitive touchpad includes an overlay identification region and said overlay identification decoder couples to said overlay identification region.

\* \* \* \* \*